United States Patent
Arrieta Diaz et al.

(10) Patent No.: US 12,025,511 B2
(45) Date of Patent: Jul. 2, 2024

(54) ZERO ENERGY MECHANICAL SENSORS AND METHODS OF USING SAME

(71) Applicant: PURDUE RESEARCH FOUNDATION, West Lafayette, IN (US)

(72) Inventors: Andres F. Arrieta Diaz, Lafayette, IN (US); Janav Parag Udani, West Lafayette, IN (US)

(73) Assignee: PURDUE RESEARCH FOUNDATION, West Lafayette, IN (US)

( * ) Notice: Subject to any disclaimer, the term of this patent is extended or adjusted under 35 U.S.C. 154(b) by 409 days.

(21) Appl. No.: 17/456,078

(22) Filed: Nov. 22, 2021

(65) Prior Publication Data
US 2022/0260433 A1    Aug. 18, 2022

Related U.S. Application Data (60) Provisional application No. 63/116,910, filed on Nov. 22, 2020.

(51) Int. Cl.
*G01L 1/04* (2006.01)
(52) U.S. Cl.
CPC .................. *G01L 1/048* (2013.01)
(58) Field of Classification Search
CPC ................ G01L 1/044; G01L 1/048
See application file for complete search history.

(56) References Cited

U.S. PATENT DOCUMENTS

| | | | | |
|---|---|---|---|---|
| 2013/0328440 A1* | 12/2013 | Kornbluh | ............... | H02N 1/00 310/300 |
| 2014/0193301 A1* | 7/2014 | Xiong | ............... | G02B 1/002 430/296 |
| 2016/0136877 A1* | 5/2016 | Rogers | ............... | B29C 61/0616 156/163 |
| 2018/0348025 A1* | 12/2018 | Jahromi | ............... | G01D 21/00 |
| 2021/0399203 A1* | 12/2021 | Farhangdoust | ........ | B64D 43/00 |
| 2023/0048543 A1* | 2/2023 | Kampasi | ............... | B32B 27/281 |
| 2023/0217588 A1* | 7/2023 | Lee | ............... | H05K 3/00 174/254 |
| 2023/0325614 A1* | 10/2023 | Alavi | ............... | G11C 23/00 703/6 |

* cited by examiner

*Primary Examiner* — Natalie Huls
(74) *Attorney, Agent, or Firm* — Edmonds & Cmaidalka, P.C.

(57) ABSTRACT

A sensor, comprising a deformable substrate, comprising a structural metamaterial in a first configuration; a plurality of raised structures disposed throughout the substrate, wherein the plurality of raised structures are invertible; a responsive material layer, wherein the responsive material layer is disposed on the plurality of raised structures and is configured to invert the plurality of raised structures in the presence of an external stimuli; and a plurality of second configurations of the deformable substrate that correspond to a plurality of inverted raised structures.

9 Claims, 8 Drawing Sheets

ZERO ENERGY MECHANICAL SENSORS AND METHODS OF USING SAME

GOVERNMENT LICENSE RIGHTS

This invention was made with government support under HR0011-20-9-0010 awarded by the Defense Advanced Research Projects Agency/DARPA. The government has certain rights in the invention.

BACKGROUND

Field

Embodiments provided herein relate to sensors. More particularly, embodiments of the present disclosure relate to zero energy mechanical sensors.

Description of the Related Art

Mechanical computation can be defined here as computations derived from mechanical or physical changes in a substance or structure, such as deformation. Mechanical computation can be explored drawing analogies with logic gates. Most examples in the literature have demonstrated how deformations can be interpreted as logic gates to perform logic operations. One well-known example can be a seal on a purchased food container, in which sealing material deforms if the food container is opened, allowing a purchaser to know if the purchased food is still fresh or has been tampered with in some way. However, such logic operations are limited to singular data outputs, providing no other useful information. Additionally, such mechanologic operations can only detect that a change occurred because changes are inconsistent in how the material or structure deforms, further limiting useful output information. Further, previous examples of mechanologic have relied on bookkeeping on an external device, thus separating the computation unit from the memory unit. Use of von Neumann-like architecture for mechanical computation necessitates external memory units.

Therefore, there is a need for converting deformation from mechanical inputs that vary in space and time into a single morphological output has. Furthermore, there is a need for mechanologic structural materials that simultaneously compute and store information, thus conducting in-memory computations similar to that in neuromorphic materials.

SUMMARY

Multistable metastructures composed of locally bistable units can be capable of coupling sensing with memory. Dome-shaped units can allow for attaining bistability from geometry without needing special materials. Coating the domes with responsive materials to external fields can introduce strains that invert the domes passively when surpassing a certain threshold. The inverted dome can store this memory mechanically that can be interpreted as an external field surpassing a certain threshold at a particular spatial position. This physical connection between sensing and memory can form the first potential usage of morphologics materials.

In at least one embodiment, the claimed invention is a sensor, comprising a deformable substrate, comprising a structural metamaterial in a first configuration; a plurality of raised structures disposed throughout the substrate, wherein the plurality of raised structures are invertible; a responsive material layer, wherein the responsive material layer is disposed on the plurality of raised structures and is configured to invert the plurality of raised structures in the presence of an external stimuli; and a plurality of second configurations of the deformable substrate that correspond to a plurality of inverted raised structures.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are, therefore, not to be considered limiting of its scope, for the invention may admit to other equally effective embodiments. It is emphasized that the figures are not necessarily to scale and certain features and certain views of the figures can be shown exaggerated in scale or in schematic for clarity and/or conciseness.

DETAILED DESCRIPTION

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure can repeat reference numerals and/or letters in the various embodiments and across the figures provided herein. This repetition is for the purpose of simplicity and clarity and does not in itself dictate a relationship between the various embodiments and/or configurations. Moreover, the exemplary embodiments presented below can be combined in any combination of ways, i.e., any element from one exemplary embodiment can be used in any other exemplary embodiment, without departing from the scope of the disclosure.

Additionally, certain terms are used throughout the following description and claims to refer to particular components. As one skilled in the art will appreciate, various entities can refer to the same component by different names, and as such, the naming convention for the elements described herein is not intended to limit the scope of the invention, unless otherwise specifically defined herein. Further, the naming convention used herein is not intended to distinguish between components that differ in name but not function.

Furthermore, in the following discussion and in the claims, the terms "including" and "comprising" are used in an open-ended fashion, and thus should be interpreted to mean "including, but not limited to."

The term "or" is intended to encompass both exclusive and inclusive cases, i.e., "A or B" is intended to be synonymous with "at least one of A and B," unless otherwise expressly specified herein.

The indefinite articles "a" and "an" refer to both singular forms (i.e., "one") and plural referents (i.e., one or more) unless the context clearly dictates otherwise. For example, embodiments using "an olefin" include embodiments where one, two, or more olefins are used, unless specified to the contrary or the context clearly indicates that only one olefin is used.

Unless otherwise indicated herein, all numerical values are "about" or "approximately" the indicated value, meaning the values take into account experimental error, machine tolerances and other variations that would be expected by a person having ordinary skill in the art. It should also be understood that the precise numerical values used in the specification and claims constitute specific embodiments. Efforts have been made to ensure the accuracy of the data in the examples. However, it should be understood that any measured data inherently contains a certain level of error due to the limitation of the technique and/or equipment used for making the measurement.

Each of the appended claims defines a separate invention, which for infringement purposes is recognized as including equivalents to the various elements or limitations specified in the claims. Depending on the context, all references to the "invention" may in some cases refer to certain specific embodiments only. In other cases, it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this disclosure is combined with publicly available information and technology.

Figure 1A:
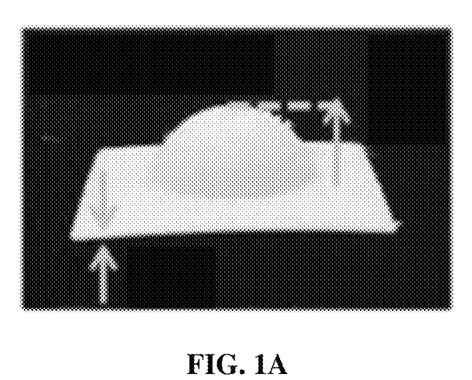
FIG. 1A depicts a bistable dome unit cell with shown substrate thickness and ground state height.
Figure 1B:
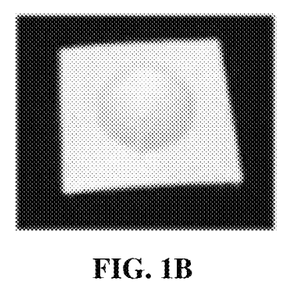
FIG. 1B depicts a bistable dome unit cell in the ground state.
Figure 1C:
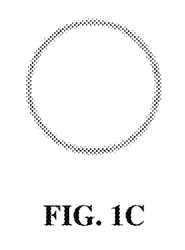
FIG. 1C depicts a graphical representation of a bistable unit cell in the ground state.
Figure 1D:
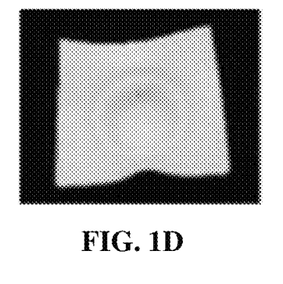
FIG. 1D depicts a bistable dome unit cell in the inverted state.
Figure 1E:
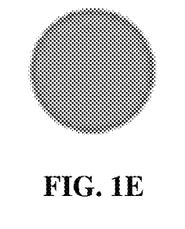
FIG. 1E depicts a graphical representation of a bistable unit cell in the inverted state.
Figure 2A:
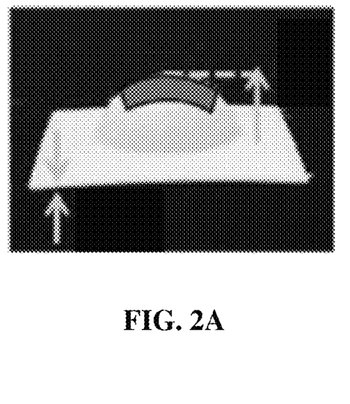
FIG. 2A depicts a bistable dome unit coated with a responsive material.
Figure 2B:
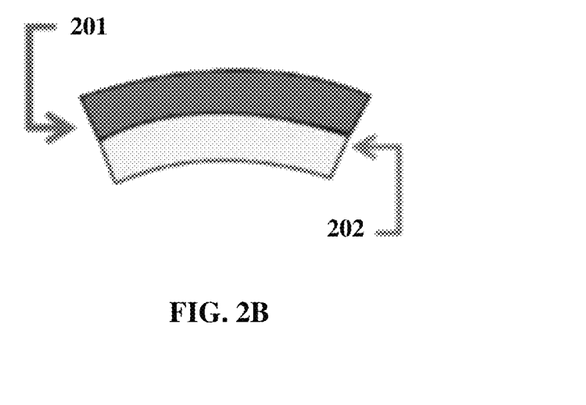
FIG. 2B depicts a graphical representation of a cross section of a bistable dome unit coated with a responsive material. The responsive material 201 coats the underlying structure 202 of the bistable dome unit.
Figure 3:
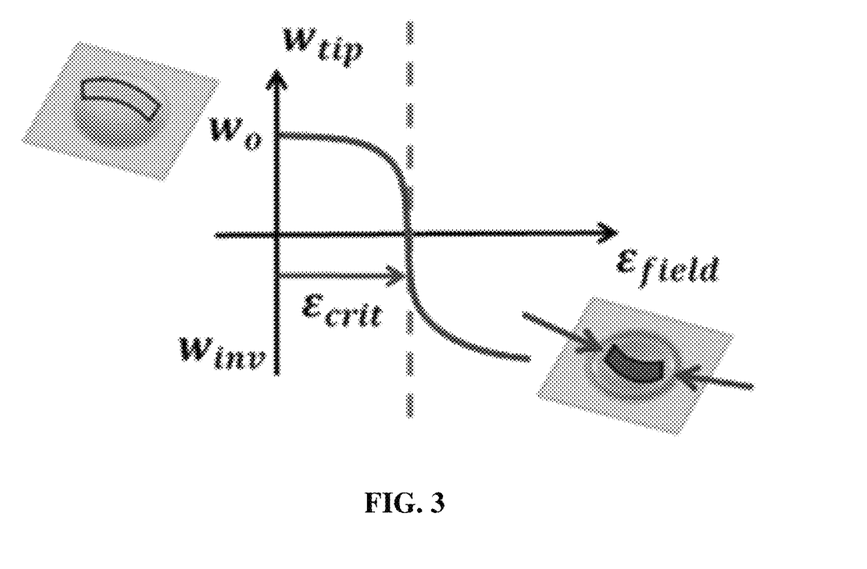
FIG. 3 depicts a graphical representation of a bistable dome unit response to external stimuli, causing passive inversion from a ground to an inverted state in the bistable dome unit when exceeding the critical inversion threshold.

Multistable metastructures composed of locally bistable units can be capable of coupling sensing with memory. Dome-shaped units can allow for attaining bistability from geometry, as shown in FIG. 1A-E, without needing special materials. Coating the domes with responsive materials to external fields can introduce strains that invert the domes passively when surpassing a certain threshold, as shown in FIGS. 2A, 2B, and 3. The inverted dome can store this memory mechanically that can be interpreted as an external field surpassing a certain threshold at a particular spatial position. This physical connection between sensing and memory can form the first potential usage of morphologics materials. The connection between sensing, memory, and computation are detailed below.

The metamaterial can be any suitable metamaterial capable of maintaining one or more invertible cells to conform to specific global states. The responsive materials can be any suitable material capable of reacting to external fields such as temperature, humidity, light, pressure, or magnetic field.

The metasheets lend themselves to mechanical computation as their hierarchical multistable behavior can be exploited to store information, as a memory, in binary form by setting an individual unit cell to the ground state as 0 or inverted state as 1. From this stored memory, logic operations or computation can be performed by ascribing coexisting global shapes to both the spatial distribution and the sequence of inputs. Spatial distribution of input refers to which domes have been inverted, whereas the sequence of the input corresponds to the order in which domes have been inverted. In analogy to electronic circuits, the term "morphologic metamaterials" is introduced to refer to metamaterial sheets that can perform logical operations and computation and that store information and memory using changes in shapes as opposed to changes in electrical potential and flow.

The invertible cells can be any suitable geometry capable of maintaining binary invertible states such as domes, bubbles, protrusions, pyramids, or other polyhedrons and nonpolyhedrons, regular or irregular.

EXAMPLES

Figure 4A:
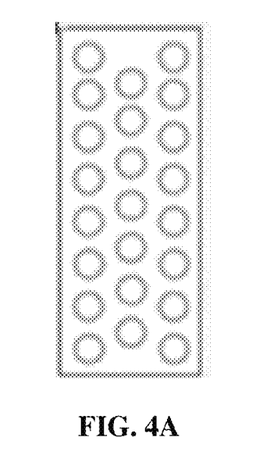
FIG. 4A depicts a graphical representation of a metasheet with 23 bistable dome unit cells capable of storing $2^{23}$ states based upon inversion patterns.
Figure 4B:
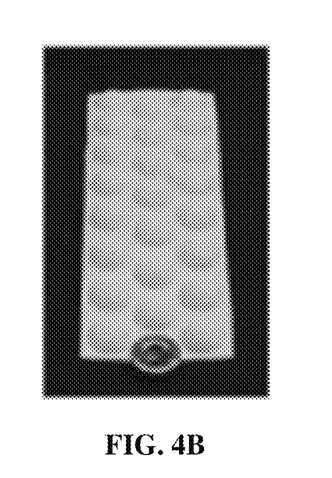
FIG. 4B depicts a metasheet with 23 bistable dome unit cells capable of storing $2^{23}$ states based upon inversion patterns.
Figure 4C:
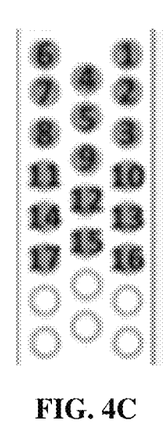
FIG. 4C depicts a graphical representation of a metasheet with a first inversion pattern.
Figure 4D:
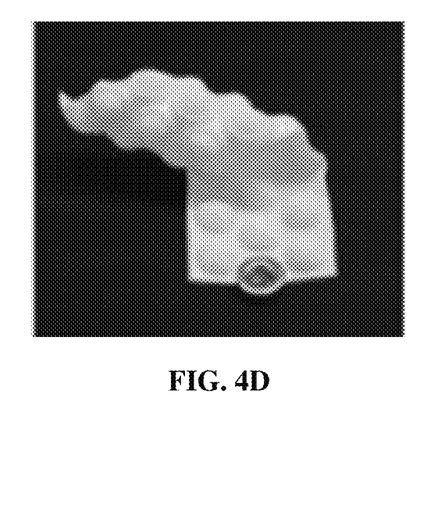
FIG. 4D depicts a metasheet configuration when subjected to the first inversion pattern shown in FIG. 4C.
Figure 4E:
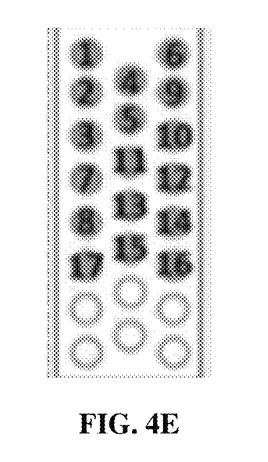
FIG. 4E depicts a graphical representation of a metasheet with a second inversion pattern.
Figure 4F:
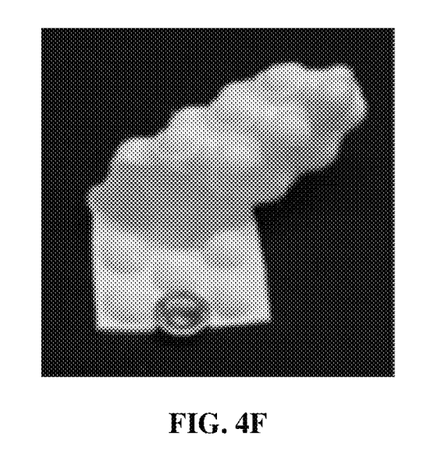
FIG. 4F depicts a metasheet configuration when subjected to the second inversion pattern shown in FIG. 4E.
Figure 4G:
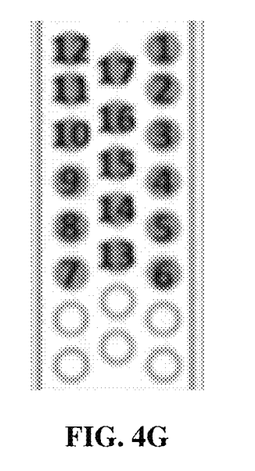
FIG. 4G depicts a graphical representation of a metasheet with a third inversion pattern.
Figure 4H:
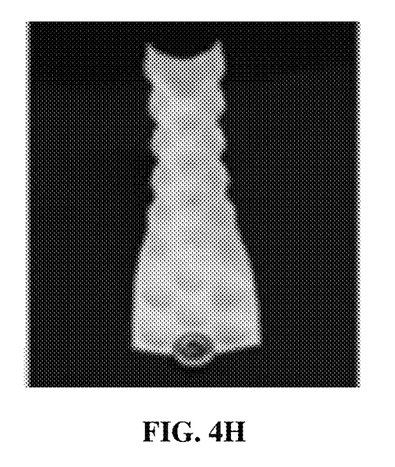
FIG. 4H depicts a metasheet configuration when subjected to the third inversion pattern shown in FIG. 4G.

To illustrate the memory capability of metamaterial sheets, a comparison of three possible coexisting global states that correspond to a single inversion pattern were performed in three different orders shown in FIGS. 4C, 4E, and 4G. Unexpectedly, the history of dome inversion dictates the final global shape attained by the sheet as shown in FIGS. 4D, 4F, and 4H. Such history dependence allows encoding the sequence of input inversion events into a final hierarchical state adopted by the dome-patterned metamaterial. As a result, the local unit cell states store memory of the domes that were inverted, whereas the final shape stores the history of inversion.

Figure 5A:
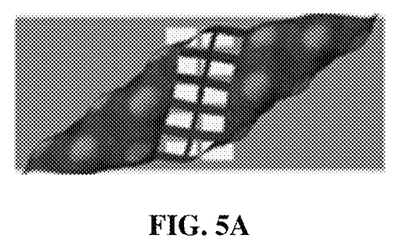
FIG. 5A depicts a simulation representation of two connected metasheets undergoing a first operation of morphological input, resulting in compatible twisting shapes.
Figure 5B:
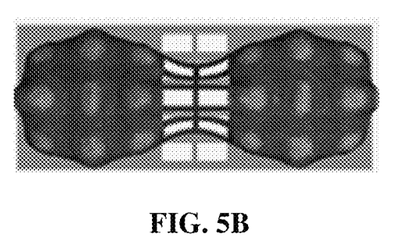
FIG. 5B depicts a simulation representation of two connected metasheets undergoing a second operation of morphological input, resulting in incompatible bending shapes.
Figure 5C:
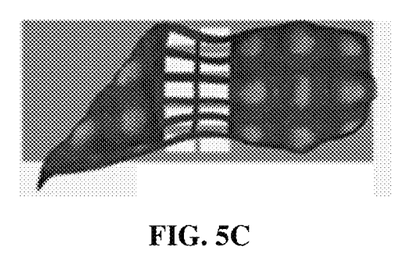
FIG. 5C depicts a simulation representation of two connected metasheets undergoing a third operation of morphological input, resulting in incompatible twisting-bending shapes.
Figure 6:
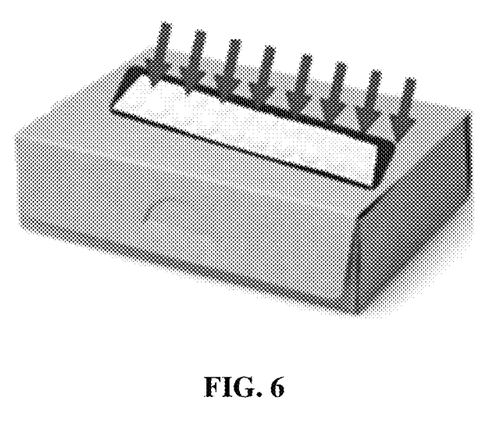
FIG. 6 depicts a graphical representation of a metasheet applied to a delivered package where the metasheet is configured to respond to external stimuli fields.

The ability to perform logic operations is shown by exploiting the compatibility between the global shapes of two sheets that are elastically connected by beam-like links as shown in FIG. 5A-C. The links can establish a common constraint between the sheets and can be used as a readout of the computation. If the history of dome inversion imposed on the two sheets is such that their global states can be incompatible, as shown in FIG. 5B-C, the readout remains straight. However, if the history of inversion on the two sheets can be compatible, a coherent final shape is reached, resulting in a slanted readout, as shown in FIG. 5A. This deformation compatibility can thus be interpreted as a logic abstraction that yields not only the inversion pattern but also uniquely the history of the mechanical inputs to the sheets. Thus, the metasheets can be capable of storing memory and conducting computation using the result of a sequence of steps on single purely elastic substrate. These morphologic metamaterials depart from von Neumann-like architecture for mechanical computation, and can be capable of showing a type of in-memory material morphologic akin to neuromorphic computation architectures.

A morphologic metamaterial sheet featuring domes in a 3×3 square pattern was investigated as a prototype for conducting mechanical computations. When all domes are inverted, the metasheet exhibits hierarchical multistability and the co-existing global shapes fall under 2 distinct families—bending-dominated shapes and twisting-dominated shapes. Each family of shapes can be associated with a different energy level. A desired shape family or sub-shapes within a given shape family featuring different orientations can be accessed by employing different dome inversion histories. Thus, the final shape of the 3×3 metasheet with all domes inverted can encode the spatiotemporal distribution of the mechanical input. This characteristic can be leveraged to design a morphologic substrate featuring two 3×3 metasheets physically connected together by beam-like links. Each metasheet corresponds to an input node of the morphologic substrate and the thin vertical line constitutes the observable output node. Drawing analogies to classical state-logic conventions, input fields resulting in dome inversion histories leading to the bending shape family are ascribed a value of 0 and input fields with dome inversion histories leading to the family of twisting shapes are ascribed a value of 1. Based on the shape of each of the input nodes, the output node yields the deformation compatibility between the respective nodes. In this regard, a straight-line configuration of the output node is ascribed the value 0 and a rotated, slanted line configuration is ascribed the value 1.

The unique history-dependent and spatial-dependent response of our metasheets allows for the design of elements with truly integrated sensing and computation functionality for reconfigurable structures, such as soft robots or morphing structures. Particularly for soft robotics, the metasheets can provide a solution to the quest for distributed sensing and computation by leveraging the collective spatiotemporal behavior of connected hierarchical metasheets. The architecture can yield a decision output based on a sequence of several computations, a complex function far exceeding the capabilities of conventional mechanical logic gates. Furthermore, latches in conventional computational architectures are able to store one memory state', while the hierarchical metamaterial architecture can resolve as many as needed based on the input field and drive computations. This enables in-situ decision-making capabilities based on the mechanical interactions with the environment and the associated unique hierarchical multistable behavior.

The morphologics materials can serve as passive sensors of storing the time of inputs without the need for batteries or transmitting the collected information. The history-dependent deformation of the morphologics metamaterials can yield the specific sequence of inversions caused by the monitored external field. As such, visual inspection of the final shape can render the history of the measured external field. The fact that these sheets can be made of common polymers, including biodegradable ones, renders them a cost-effective alternative to sensors that require power to store time information in an external memory unit. Such sensors can be utilized for agriculture or for tracking the environment to which a food or pharmaceutical product has been exposed over time.

The metasheets can track the progression of a field and can compute depending on the field's shape and timing. This allows for conducting simple decision making with zero power and external interventions. Examples include, following sunlight in for solar panels, detecting the concentration of specific particles in biomedical sensors, and reconfiguring wearable sensors and devices.

All patents and patent applications, test procedures (such as ASTM methods, UL methods, and the like), and other documents cited herein are fully incorporated by reference to the extent such disclosure is not inconsistent with this disclosure and for all jurisdictions in which such incorporation is permitted.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below.

The foregoing has also outlined features of several embodiments so that those skilled in the art can better understand the present disclosure. Those skilled in the art should appreciate that they can readily use the present disclosure as a basis for designing or modifying other methods or devices for carrying out the same purposes and/or achieving the same advantages of the embodiments disclosed herein. Those skilled in the art should also realize that such equivalent constructions do not depart from the spirit and scope of the present disclosure, and that they can make various changes, substitutions, and alterations herein without departing from the spirit and scope of the present disclosure, and the scope thereof is determined by the claims that follow.

We claim:

1. A sensor, comprising;
   a deformable substrate, comprising a structural metamaterial in a first configuration;
   a plurality of raised structures disposed throughout the substrate, wherein the plurality of raised structures are invertible;
   a responsive material layer, wherein the responsive material layer is disposed on the plurality of raised structures and is configured to invert the plurality of raised structures in the presence of an external stimuli; and
   a plurality of second configurations of the deformable substrate that correspond to a plurality of inverted raised structures.

2. The sensor of claim 1, wherein the plurality of raised structures are dome-shaped.

3. The sensor of claim 1, wherein the sensor is a first sensor and is connected to a second sensor using a plurality of elastic substrates.

4. The sensor of claim 3, wherein the plurality of elastic substrates have a configuration dependent upon the configuration of the first sensor and the configuration of the second sensor.

5. A method for using a sensor, comprising;
subjecting a sensor to an external stimuli, the sensor comprising;
   a deformable substrate, comprising a structural metamaterial in a first configuration;
   a plurality of raised structures disposed throughout the substrate, wherein the plurality of raised structures are invertible;
   a responsive material layer, wherein the responsive material layer is disposed on the plurality of raised structures and is configured to invert the plurality of raised structures in the presence of the external stimuli; and
   a plurality of second configurations of the deformable substrate that correspond to a plurality of inverted raised structures;
inverting one or more of the raised structures in response to the external stimuli; and
recording a spatial and sequential memory corresponding to the second configuration of the sensor.

6. The method of claim 5, wherein the plurality of raised structures are dome-shaped.

7. The method of claim 5, wherein the sensor is a first sensor and is connected to a second sensor using a plurality of elastic substrates.

8. The method of claim 7, wherein the plurality of elastic substrates have a configuration dependent upon the configuration of the first sensor and the configuration of the second sensor.

9. The method of claim 8, wherein the configuration of the plurality of elastic substrates acts as a logic gate between the first sensor and the second sensor.

* * * * *